United States Patent Office 2,883,021
Patented Apr. 21, 1959

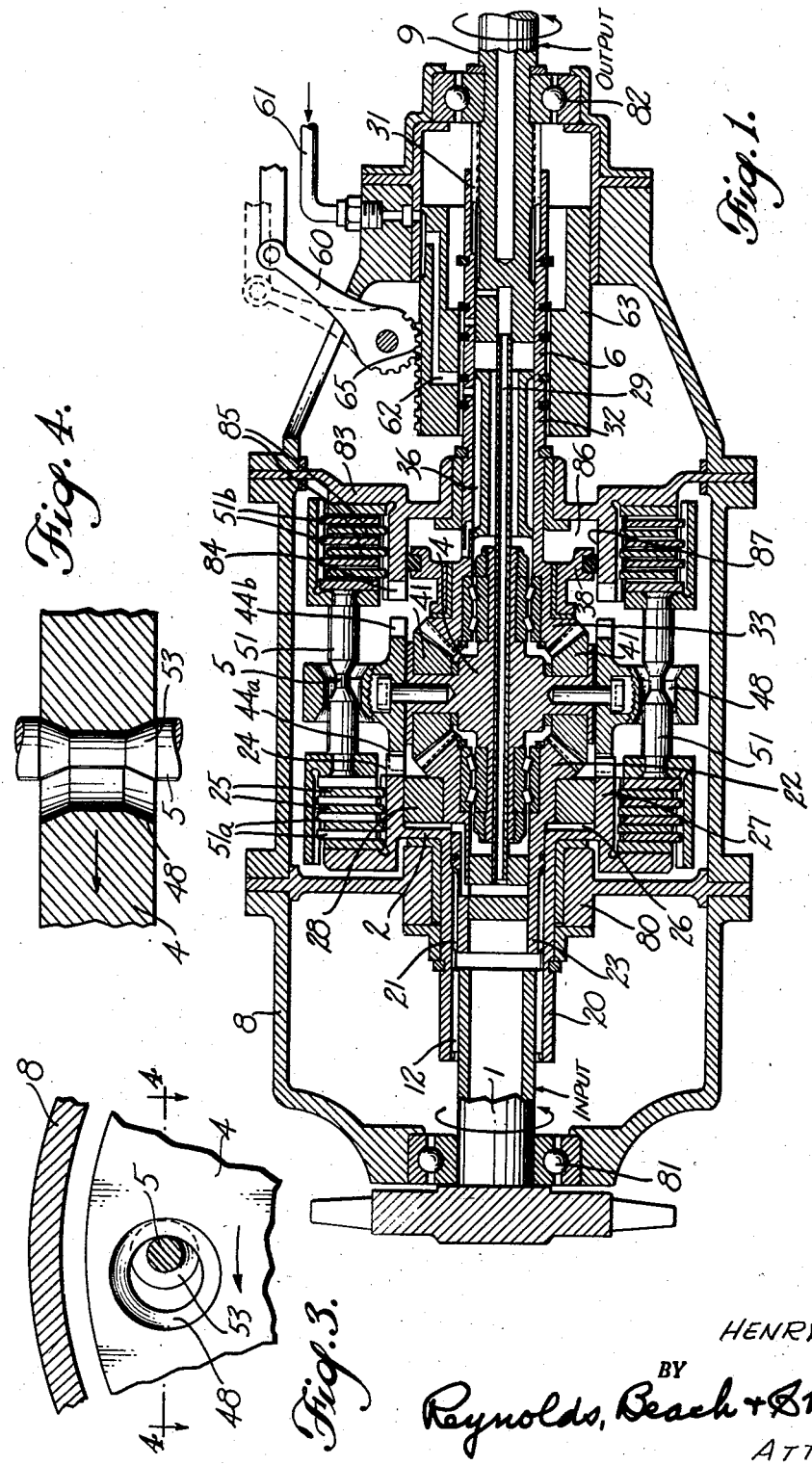

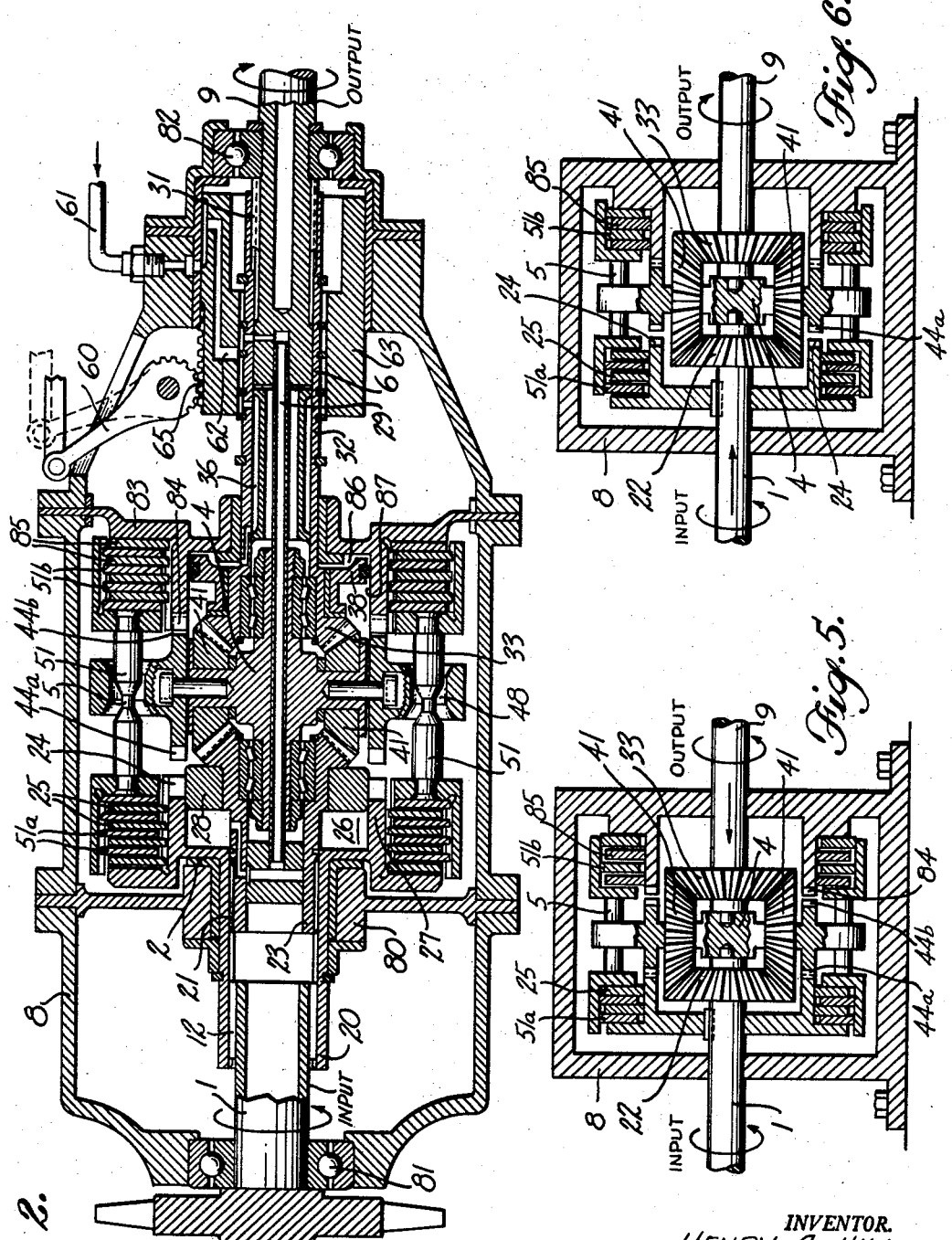

2,883,021

CLUTCH-BRAKE SYNCHRONIZER MECHANISM FOR REVERSING GEAR

Henry C. Hill, Seattle, Wash., assignor to Boeing Airplane Company, Seattle, Wash., a corporation of Delaware Application October 26, 1953, Serial No. 388,345

3 Claims. (Cl. 192—18)

The present invention pertains to a reversing mechanism, such as has been designed for delivering in either rotative sense the output of a rotary gas turbine engine. The invention involves delivering the output of a unidirectionally rotative input or driving shaft to an axially aligned output shaft which is to be rotated in either of the two rotative senses, through a continuously engaged transmission mechanism such as a gear set in which the gears are at all times intermeshed, through the medium of alternatively and selectively interengageable sets of dogs, in conjunction with synchronizer means which in advance of interengagement of the dogs brings the one axially shiftable set of dogs always into rotative synchronism with another relatively axially fixed set of dogs, rotative or stationary as the case may be, and which therefore, prior to their engagement, is noncoincident rotatively with the shiftable set of dogs with which they are to engage.

The objects above are attained by bodily axial shifting of the transmission mechanism, including a carrier assembly for the bevel gear set, with which carrier assembly the axially shiftable set of dogs is operatively associated, so that these dogs may engage either with relatively axially fixed but rotative dogs on the rotative input shaft or with relatively axially fixed but stationary dogs, to effect reversal of the output shaft through the reversible transmission mechanism, accompanied, as stated above, by engagement of a synchronizer such as includes friction clutch-brake mechanism in advance of the meshing of the dogs, to bring the dogs which are to mesh into relative rotation or nonrotation at the same rate as the dogs with which they are about to mesh.

Also the invention contemplates the shifting of the carrier assembly by fluid pressure means, with actuating pistons and cylinders associated directly with the shiftable carrier assembly and cooperating axially fixed parts of the fluid pressure system. Usually the pistons are part of the carrier assembly and the cylinders within which the pistons slide are the one carried by a fixed housing, and the other by a rotating disk. Supply of a pressure fluid to one or the other cylinder effects bodily axial shifting of the carrier assembly in whichever sense is required to effect rotation of the output shaft in the desired rotative sense. Ducts for the pressure fluid, and a control valve, are operatively connected with the carrier assembly.

The invention will be best understood from a study of the accompanying drawings, wherein the invention is disclosed in purely diagrammatic form and in simplified mechanical form, from which latter many desirable or even practically necessary parts have been omitted in order to avoid obscuring the mechanism which embodies the principles of the invention with a mass of detail not necessary to understanding of those principles.

Figure 1 is in general an axial sectional view through the reversing gear, showing parts shifted into what may be termed the forward drive position, that is, a position wherein the input and output shafts are rotating in the same rotative sense, while Figure 2 is a view similar to Figure 1, but showing the parts shifted to the opposite or reversed position wherein the output shaft is rotating in the reverse rotative sense from the input shaft.

Figure 3 is a fragmentary end view of a synchronizer rod in its active shifting engagement with the pinion carrier of the bevel gear set, and Figure 4 is a section through the same along the line 4—4 of Figure 3.

Figure 5 is a purely diagrammatic view, illustrating the principles of the invention, with parts in the relative positions corresponding to Figure 1, and Figure 6 is a similar view showing parts in the relative positions corresponding to Figure 2.

The input shaft at 1 and the output shaft at 9 are coaxially arranged, but with their ends spaced apart. Both are rotative in a housing 8, bearings 81 and 82 being shown for the purpose. The input shaft would normally be connected to the power source through gear reduction mechanism, but in order to avoid the complication of this, together with auxiliary drives and the like, all such mechanism has been omitted from the drawings.

A disk 2 is journaled in the casing 8, or in an internal bearing 80 thereof, for rotation, but is held against movement axially relative to the housing. Its sleeve 20 is splined to the input shaft 1, as is indicated at 12, so that the disk 2 rotates continuously at the same speed as the input shaft 1. Splined to the sleeve 20 of the disk 2, as indicated at 21, and so in effect splined to the shaft 1, is a sleeve 23, on one end of which is formed a bevel gear 22. This bevel gear 22, by reason of the splined connections described, rotates at the same speed and in the same sense as the input shaft 1. It is, however, slidable axially with respect to the shaft 1 and disk 2, and the means for so doing will be described shortly.

A bevel gear 33, facing the gear 22, is formed with a long hollow sleeve 32, which is spline-connected at 31 to the output shaft 9, so that the gear 33 rotates continuously at the same speed and in the same sense as the output shaft 9, but it, too, is slidable axially with relation to the output shaft 9. The means for doing this will also be described later. This sleeve 32 also constitutes a valve housing, as will shortly appear.

A rotative pinion carrier 4 is disposed coaxially with and intermediate the facing bevel gears 22, 33, and is journaled within the latter. Upon it are pivotally mounted transverse bevel pinions 41 which mesh with each of the gears 22 and 33. By so doing it becomes clear that if the pinion carrier 4 is free to rotate with the input shaft 1, by being locked thereto, the pinions will lock together the shafts 1 and 9, and the output shaft 9 will rotate in the same sense and at the same speed as the input shaft 1. On the other hand, if the pinion carrier 4 is held against rotation while the input shaft 1 continues to rotate in the same rotative sense the pinions 41 will rotate about their pivot mounts on the pinion carrier 4, and will transmit the rotation of the shaft 1 to the bevel gear 33, and so to the output shaft 9, and will cause the latter to rotate in the reverse sense, but at the same speed as the input shaft 1. The pinion carrier 4, and the bevel gear set carried thereby, constitutes a carrier assembly.

A set of dogs 24 is formed on the inner face of the rotative disk 2. Another set of dogs 84, facing the dogs 24 but axially spaced therefrom, is formed on a partition 83 of the housing. The carrier 4 is provided with two sets of dogs 44a and 44b, for engagement selectively with the dogs 24 or with the dogs 84, respectively, such engagement being effected by axial shifting of the carrier assembly, including the bevel gears 22 and 33 and the bevel pinions 41 and the pinion carrier 4, and, of course, the dogs 44a and 44b.

Operatively associated with the carrier assembly, and with the disk 2 and the partition 83, respectively, is a synchronizer mechanism of known form. Clutch elements, such as the plates 51a for example, are interspersed between plates 25, the latter of which are splined to rotate with the disk 2. At the opposite side plates 51b are interspersed between plates 85, which latter are splined to the partition 83 and therefore are fixed relative to the housing 8. By shifter rods 5 and 51, beveled at 53 for engagement with the complementally beveled oversize holes 48 in the carrier 4, and which are thus operatively connected to shift with the carrier 4 in known fashion, and relative to which the clutch plates 51a and 51b may not rotate, the clutch plates 51a and 25 may be pressed together (to the left in Figures 1 and 2) to lock the carrier assembly to rotate with the disk 2, or by reverse movement axially of the carrier assembly (to the right in Figures 1 and 2) the plates 51b and 85 may be pressed together to hold the carrier assembly stationary with respect to the housing 8. The axial shifting mechanism which is about to be described is so arranged that these clutch elements are urged together, by interengagement of bevels 53 and 48, as in Figures 3 and 4, prior to engagement of the dogs 24 and 44a, or 84 and 44b, so that by the time these dogs are urged axially into interlocking engagement, the carrier assembly is already rotating at the same speed, if it is the disk 2 which is to be engaged, or is stationary if it is the partition 83 which is to be engaged. The bevels 53 and 48 can then disengage, and permit continued axial movement of the rod 5 within the hole 48. The net effect is the same as if the input shaft 1 and the output shaft 9 were bodily axially shiftable as well as rotatable, as is suggested in Figures 5 and 6. In actual practice these shafts are not axially movable, but the sleeves 23 and 32, which being splined to the respective shafts 1 and 9 are in effect part of such shafts, are thus axially shiftable.

Shifting axially is accomplished under the control of valve mechanism at 6, controllable by a lever 60 or equivalent control element to admit pressure fluid from inlet 61 either into a cylinder space 26 or into the cylinder space 86, and at the same time to relieve the opposite cylinder space through a connection not shown. The cylinder space 26 is shown as formed within a cylinder 27, formed in the disk 2, within which is slidable a piston 28 which is fixed with relation to the bevel gear 22. The cylinder space 86 is shown as formed within a cylinder 87 formed on the partition 83, within which is movable a piston 38 which is fixed with relation to the bevel gear 33. Obviously, it is immaterial if the mounting of the respective pistons and cylinders is reversed. The precise form of the valve mechanism is not material to the invention, and that shown is somewhat diagrammatic. Thus pressure fluid entering at 61 may pass by way of the passage 62 in the axially slidable valve body 63 either to enter the cylinder 86 by way of the passage 36, or it may enter the passage 29, and so have access to the cylinder space 26, in the latter case effecting an axial shifting of the carrier assembly from the position of Figure 1 to that of Figure 2. Axial shifting of the valve body 63 is suitably accomplished, as by means of a rack and gear connection or the like, indicated at 65, between the lever 60 and the valve body 63. The arrangement is such, with particular relation to the axial distance traveled to effect disengagement of one clutch and the corresponding dogs, and engagement of the other clutch, and subsequently to effect engagement of the second set of dogs, that the carrier assembly will shift with extreme movement of the valve body until the opposite or previously disengaged clutch elements engage, and then will move farther to engage the dogs, whereupon the released valve body will slack off to place the valve in neutral position, and so to hold all parts in the attained position. Obviously, by stopping the valve body 63 in an intermediate position both sets of dogs may be kept disengaged, and all parts are in a neutral position.

It is believed the operation of the device will now be clear, and the diagrammatic views, Figures 5 and 6, show in principle all essential operating parts of the mechanism, with the exception of the pressure fluid mechanism to effect the axial shifting of the carrier assembly. Figures 1 and 2, on the other hand, show the latter, and illustrate that the shafts 1 and 9 are not, but the carrier assembly is, bodily shifted. The gears thereof and the pinions remain always in mesh, and the axial shifting effects first clutch engagement and then engagement of the dogs, so that in the Figure 1 position the entire mechanism, including the entire carrier assembly, the disk 2, and the output shaft 9 rotate conjointly in the same rotative sense, whereas in Figure 2 the carrier assembly is held stationary by engagement with the housing, or a part thereof, and continued unidirectional rotation of the input shaft 1 transmits rotation through rotation of the individual bevel pinions 41 to effect rotation of the bevel gear 33 and of the output shaft 9 in the reverse rotative sense but at the same speed.

I claim as my invention:

1. In a reversible drive mechanism which includes a non-rotative housing and a rotative carrier, the improved clutch element speed synchronizer which comprises input friction means for connection to an input shaft for rotation therewith, first carrier friction means for connection to the rotative carrier for rotation therewith and frictionally engageable with said input friction means, stationary friction means for connection to the housing and held against rotation relative thereto, second carrier friction means for connection to the rotative carrier for rotation therewith and frictionally engageable with said stationary friction means, and synchronizer engaging means operatively connected to said first and second carrier friction means to effect frictional engagement of said first carrier friction means and said input friction means sufficiently to effect substantially equal rotative speed thereof and hence of the input shaft and carrier prior to coupling of the input shaft and the carrier, or alternatively to effect frictional engagement of said second carrier friction means and said stationary friction means sufficiently to bring the carrier substantially to a stop prior to coupling of the housing and the carrier, a first cylinder and cooperating piston carried, one for rotation with the input shaft and the other with the carrier, a second cylinder and coperating piston carried, one for rotation with the carrier and the other by the housing, and control means for supplying pressure fluid alternatively to one or the other cylinder to effect bodily shifting of the carrier in the respective axial senses, and engagement of the corresponding friction means.

2. The reversible drive mechanism defined in claim 1, the two pistons being connected for axial movement with the carrier, the cylinders being connected respectively with the input shaft and with the housing, and the control mechanism including valve means at one end of the mechanism and conduit means including a conduit extending through the carrier to its opposite end, for directing fluid alternatively to one or the other cylinder to effect appropriate and opposite bodily shifting of the pistons and the carrier, and engagement of the corresponding friction means and coupling elements.

3. In the reversible drive mechanism defined in claim 2, the control means including a valve body supported from and shiftable relative to the housing, and a valve sleeve arranged for rotation with the output shaft, and connected to the corresponding cylinder for axial movement, a duct extending axially through and spaced from said valve sleeve to define an annular fluid passage leading to that cylinder, said duct leading to the opposite cylinder, and means to shift said valve body to cut off fluid supply to the cylinders or to supply fluid alternatively to either cylinder by way of said duct or said fluid passage.

(References on following page)

References Cited in the file of this patent

UNITED STATES PATENTS

| | | |
|---|---|---|
| 1,703,846 | Jackson | Feb. 26, 1929 |
| 2,347,099 | Gridley | Apr. 18, 1944 |
| 2,399,657 | Banker | May 7, 1946 |
| 2,463,265 | Graves | Mar. 1, 1949 |
| 2,546,746 | Henning | Mar. 27, 1951 |
| 2,547,732 | Baker | Apr. 3, 1951 |
| 2,564,466 | Clifton | Aug. 14, 1951 |

FOREIGN PATENTS

| | | |
|---|---|---|
| 551,316 | Great Britain | Feb. 17, 1943 |